United States Patent
Liu et al.

(10) Patent No.: US 9,329,275 B2
(45) Date of Patent: May 3, 2016

(54) FILM DOSIMETER AND METHOD OF DETERMINING RADIATION DOSE USING THEREOF

(71) Applicant: National Tsing Hua University, Hsinchu (TW)

(72) Inventors: Yuan-Hao Liu, Hsinchu (TW); Ming-Chen Hsiao, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 156 days.

(21) Appl. No.: 13/886,183

(22) Filed: May 2, 2013

(65) Prior Publication Data

US 2014/0110601 A1   Apr. 24, 2014

(30) Foreign Application Priority Data

Oct. 23, 2012   (TW) .............................. 101139117 A

(51) Int. Cl.
*G01T 1/11*    (2006.01)
*G01T 1/06*    (2006.01)
*G01T 3/00*    (2006.01)

(52) U.S. Cl.
CPC ... *G01T 1/06* (2013.01); *G01T 3/00* (2013.01); *G01T 1/11* (2013.01)

(58) Field of Classification Search
CPC .......................................................... G01T 1/11
USPC ....................................................... 250/473.1
See application file for complete search history.

(56) References Cited

U.S. PATENT DOCUMENTS

| | | | | |
|---|---|---|---|---|
| 3,577,161 | A | * | 5/1971 | Oberhoffer et al. ......... 250/484.3 |
| 4,506,157 | A | * | 3/1985 | Keller ........................... 250/337 |
| 5,015,855 | A | * | 5/1991 | Braunlich et al. ............. 250/337 |
| 2013/0193316 | A1 | * | 8/2013 | Micke et al. .............. 250/252.1 |

* cited by examiner

*Primary Examiner* — Christine Sung
(74) *Attorney, Agent, or Firm* — WPAT, P.C., Intellectual Property Attorneys; Anthony King

(57) ABSTRACT

A film dosimeter is disclosed in the present invention and doped with a sensitizer for determining a neutron and gamma-ray mixed radiation field. The sensitizer comprises quantitative lithium atoms with a different atom percentage of lithium-6 and lithium-7. Theoretically, the atom percentage of the lithium-6 in the lithium atoms is ranged from 0.1 to 99. On the other hand, a method of determining radiation doses of a neutron and gamma-ray mixed radiation field by using the abovementioned film dosimeter is also disclosed in the present invention.

14 Claims, 5 Drawing Sheets

| | | | |
|---|---|---|---|
| Composition of $^6$Li in lithium atoms (atom %) | 0.1 at% | 7 at% | 99 at% |
| Composition of $^6$Li in the active layer (atom %) | 0.008 at% | 0.056 at% | 0.792 at% |
| Sensitivity to the thermal neutrons | low | medium | high |
| Sensitivity to the fast neutrons | low | low | low |
| Sensitivity to the photons | medium | medium | medium |

| Composition of $^6$Li in lithium atoms (atom %) | 0.1 at%　　7 at%　　　　　　　99 at% |
|---|---|
| Composition of $^6$Li in the active layer (atom %) | 0.008 at%　0.056 at%　　　0.792 at% |
| Sensitivity to the thermal neutrons | low | medium | high |
| Sensitivity to the fast neutrons | low | low | low |
| Sensitivity to the photons | medium | medium | medium |

Figure 2

FILM DOSIMETER AND METHOD OF DETERMINING RADIATION DOSE USING THEREOF

CROSS-REFERENCE TO RELATED APPLICATIONS

This Non-provisional application claims priority under 35 U.S.C. §119(a) on Patent Application No(s). 101139117 filed in Taiwan, Republic of China, Oct. 23, 2012, the entire contents of which are hereby incorporated by reference.

FIELD OF THE INVENTION

This invention relates to a film dosimeter, especially relates to the composition of the film dosimeter and a method of determining radiation dose using thereof with the improvement for the sensitivity of detecting the neutron dose in a neutron and gamma-ray radiation mixed field by changing the composition between lithium-6 and lithium-7 in the sensitizer.

BACKGROUND OF THE INVENTION

Radiation is not only highly related to our daily life but also exist everywhere. For example, both cosmic ray and earth radiation are natural background radiations and differ with geography and geology. Besides the natural background radiation, the radiation sources caused from human, such as nuclear power, radio diagnosis, radiotherapy and nuclear medicine, are also broadly applied for human's life.

According to the data published by National Health Administration in 2010, cancer is still the top reason of death. The percentage of death caused by cancer is 28.4, and it is obviously that cancer threatens human's health. To date, surgery, chemotherapy and radiotherapy are the main methods for treating cancer.

The principle of radiotherapy is to use a high energy radiation, such as an indirectly ionizing radiation, to ionize or excite atoms that compose tumor cells when it reacts with the tumor cells and further produce toxic free radicals to destroy the tumor cells; tumor cells can be destroyed also by radiation energy released by a directly ionizing radiation which causes single- or double-strand breaks within the deoxyribonucleic acids of tumor cells. As to the dose of the therapy prescription, it is based on a complicated treatment plan to evaluate the absorption radiation dose of the tumor cells and the normal tissues, and the results are further provided to doctors to verify the feasibility and anticipated effects. When the medical team confirms the treatment plan, the irradiation parameters will be sent to the instrument. Also, the quality of the irradiation beam will be checked regularly to insure that the differences between the therapy prescription and the dose absorbed by patients are within an acceptable error. After a plurality of irradiations, patients complete their treatment. The effect of radiotherapy is based on the theory of radiation biology. The dose-response curve shows that the greatest slope resides in the middle of the curve, and a change of 5% in dose will affect the tumor control probability by 10% to 20%, and the normal tissue complication probability by 20% to 30%. Therefore, the accurate dose delivery is very important in radiotherapy.

Most of the common medical radiotherapy equipment are high-energy linear accelerators (LINACs), such as high energy X-ray therapy machines of 6 MV, 10 MV, 12 MV or 18 MV. In addition, more advanced radiotherapy modalities, such as proton therapy, carbon ion therapy and boron neutron capture therapy, are also developed to fight against cancers and to increase the patient survival rate. Therefore, radiotherapy should accompany more deliberate plans for quality control and dose verification to assure the treatment quality for patients.

Radiochromic film contains special chemicals to react with radiation and let the chemicals undergo energy level change. And then, an observable color change of the radiochromic film will emerge as a result of polymerization or other coloration reactions. The radiation dose can then be estimated through a coloration degree of the colorization. As shown in FIG. 1, a conventional radiochromic film, such as GAFCHROMIC® External Beam Therapy 2 (EBT2) film 100 produced by International Specialty Products Inc. (USA), is widely used for clinical dose delivery verification. Its structure described from bottom to top contains a base 10, an active layer 20, a surface layer 30, an adhesive 40 and a top 50. However, the film as mentioned above still has a plurality of limitations. For example, it is mostly used to measure the photon dose in a photon radiation field rather than being used to measure the dose in a mixed one.

SUMMARY OF THE INVENTION

Accordingly, the present invention provides a film dosimeter to let the abovementioned radiochromic film to be capable of measuring doses in a neutron and gamma-ray radiation mixed field. The film dosimeter is doped with a sensitizer, and the sensitizer comprises quantitative lithium atoms with a different atom percentage of lithium-6 ($^6$Li) and lithium-7 ($^7$Li).

Preferably, the mixed radiation field is a neutron and gamma-ray radiation mixed field. Moreover, the atom percentage of $^6$Li in the lithium atoms is ranged from 0.1 to 99.

Preferably, the film dosimeter at least comprises a GAFCHROMIC® External Beam Therapy 2 (EBT2) film and the film at least comprises a base, an active layer, a surface layer, an adhesive and a top. The active layer is placed on the base and doped with the sensitizer. The sensitizer can be further doped in an area of 10 μm above and 10 μm below the active layer. From the active layer, the surface layer, the adhesion layer and the top are placed sequentially from bottom to top. Theoretically, the atom percentage of $^6$Li in the active layer is ranged from 0.008 to 0.792.

Preferably, the film dosimeter is further doped with quantitative hydrogen elements ($^1$H).

Preferably, the film dosimeters further comprise a plurality of the GAFCHROMIC® External Beam Therapy 2 (EBT2) films with different atom percentage of $^6$Li.

The present invention further provides a method of determining radiation doses in a mixed radiation field. The abovementioned method at least comprises the following steps: first, two film dosimeters doped with different amount of sensitizers are provided. The abovementioned sensitizer has quantitative lithium atoms with different atom percentage of lithium-6 ($^6$Li) and lithium-7 ($^7$Li). Then, the film dosimeters are irradiated by a neutron beam, and then the film dosimeters are placed for a self-developing time till the colorization reaches an end-point. Finally, the film dosimeters are scanned to measure the individual colorization values of films with different neutron sensitivities; the colorization value corresponds to a coloration degree of the colorization. Therefore, doses of the neutron and gamma-ray radiation mixed field are calculated.

Preferably, the method disclosed in the present invention further comprises a step of obtaining an optical density value after scanning the film dosimeters.

Preferably, the value of the colorization is calculated by utilizing the optical density value and the equivalent coloration value of the film with respect to the thermal neutrons into an equation.

Preferably, the mixed radiation field is a neutron and gamma-ray radiation mixed field and the neutron energy is belonged in the thermal neutron energy region.

Preferably, the sensitivity of the sensitizer is increased or decreased by adjusting the atom percentage of $^6$Li in the lithium atoms. Theoretically, the atom percentage of $^6$Li in lithium atoms is ranged from 0.1 to 99.

Preferably, the film dosimeter is further doped with quantitative hydrogen elements ($^1$H) to decrease the neutron kinetic energy for detecting the fast neutron dose.

The features and advantages of the present invention will be understood and illustrated in the following specification and FIGS. 1~3.

BRIEF DESCRIPTION OF THE DRAWINGS

FIG. 2 is a diagram showing the content of lithium-6 existed in the film dosimeter and its sensitivity with respect to the mixed radiation field according to the present invention;

DETAILED DESCRIPTION OF THE INVENTION

Figure 1:
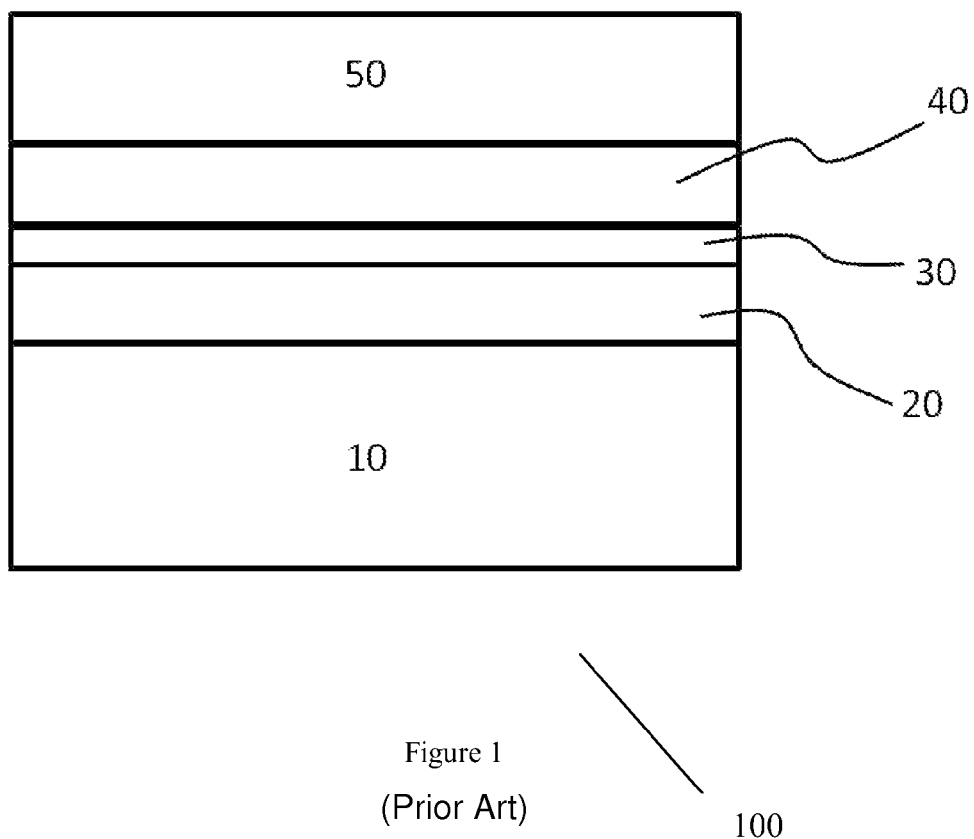
FIG. 1 is a diagram showing the cross section of the GAFCHROMIC® External Beam Therapy 2 (EBT2) film structure according to a prior art.

Accordingly, the present invention provides a film dosimeter to let the abovementioned radiochromic film to be capable of measuring doses in a neutron and gamma-ray radiation mixed field. Thus, two points are mentioned as follows: first, the total thickness of the GAFCHROMIC® External Beam Therapy 2 (EBT2) film, which is a widely used radiochromic film, is about 300 μm. As shown in FIG. 1, the structure described from bottom to top comprises a base 10, an active layer 20, a surface layer 30, an adhesive 40 and a top 50. The base 10 and the top 50 are all polyester material. The active layer involved in the present invention is composed of lithium pentacosa-10,12-dyionic acid (Li-PCDA). The thickness and the composition of each layer are shown in Table 1 and will not be illustrated in detail.

TABLE 1

The structure and composition of EBT2 film

| | Thickness (μm) | Composition (atom %) | | | | | | |
|---|---|---|---|---|---|---|---|---|
| | | H | Li | C | N | O | Cl | K | Br |
| top | 50 | 36.4 | 0 | 45.5 | 0 | 18.2 | 0 | 0 | 0 |
| adhesion layer | 25 | 57.1 | 0 | 33.3 | 0 | 9.5 | 0 | 0 | 0 |
| surface layer | 5 | 56.9 | 0.9 | 25.7 | 0 | 15.6 | 0.9 | 0 | 0 |
| active layer | 30 | 58.3 | 0.8 | 29.6 | 0.1 | 10.7 | 0.3 | 0.1 | 0.1 |
| base | 175 | 36.4 | 0 | 45.5 | 0 | 18.2 | 0 | 0 | 0 |

The mixed radiation field disclosed in the present invention is a neutron and gamma-ray radiation mixed field. Basically, the neutrons can be divided into fast neutrons and thermal neutrons according to their kinetic energy. For example, the thermal neutron kinetic energy is less than 0.55 eV and the fast neutron kinetic energy is above 10,000 eV. There are still many kinds of the neutrons besides the fast neutrons and the thermal neutrons, such as slow neutrons, epithermal neutrons, hot neutrons, cold neutrons, ultra-cold neutrons; however, the following embodiment is focused on detecting a thermal neutron radiation field and a fast neutron radiation field. But the present invention is not limited thereto even though the other types of neutrons will not be further described herein.

Because lithium-6 ($^6$Li) has much higher thermal neutron absorption cross section and Q value, it is used as a sensitizer in the present invention to allow the film dosimeter, such as EBT2 film, to be capable of detecting a mixed filed with both neutron and gamma-ray radiations.

Thus, the present invention provides a film dosimeter doped with a sensitizer to detect a mixed radiation field. The sensitizer comprises quantitative lithium atoms with different atom percentage of lithium-6 ($^6$Li) and lithium-7 ($^7$Li). Preferably, the atom percentage of the lithium atoms within the active layer of the film is about 0.8. The sensitivity of the film dosimeter with respect to the neutrons can be changed by adjusting the composition between $^6$Li and $^7$Li in the lithium atoms according to the present invention. Furthermore, the nature lithium atoms are composed of 7.59% of $^6$Li and 92.41% of $^7$Li, however, the above composition between $^6$Li and $^7$Li of the lithium atoms in the active layer 20 will be changed in the present invention. That is, the sensitivity of the film dosimeter with respect to the thermal neutrons can be increased by increasing the atom percentage of $^6$Li in the lithium atoms. On the contrary, the sensitivity of the film dosimeter with respect to the thermal neutrons can be decreased by decreasing the atom percentage of $^6$Li in the lithium atoms. Although the above embodiment only describes the changing of the atom percentage of $^6$Li in the active layer 20, the atom percentage of $^6$Li in the surface layer 30 can also be changed to modify the thermal neutron sensitivity. That is, the present invention is not limited to the above embodiment.

Please refer to FIG. 2; it is a diagram showing the content of lithium-6 of the film dosimeter and its sensitivity with respect to the mixed radiation field according to a preferred embodiment of the present invention. The sensitivity of the film dosimeter with respect to the neutrons can be changed by adjusting the composition between $^6$Li and $^7$Li in the lithium atoms as mentioned before; therefore, the numbers shown in the upper portion of the figure (i.e. above the ruler) represent the atom percentage of $^6$Li in the lithium atoms. Preferably, the atom percentage of $^6$Li in the lithium atoms is ranged from 0.1 to 99. As shown in FIG. 2, it is clear that the sensitivity of the film dosimeter with respect to the thermal neutrons is low when the atom percentage of $^6$Li in the lithium atoms is 0.1. In the meantime the sensitivity of the film dosimeter with respect to the fast neutrons and the photons are low and medium separately. Moreover, the numbers shown in the lower portion of FIG. 2 (i.e. below the ruler) represent the atom percentage of $^6$Li in the active layer of the film dosimeter. Preferably, the atom percentage of $^6$Li in the active layer is ranged from 0.008 to 0.792.

According to the relative position of the ruler as shown in FIG. 2, the atom percentage of $^6$Li in the active layer is 0.008 when that of $^6$Li in the lithium atoms is 0.1.

Please refer to FIG. 2, the sensitivity of the film dosimeter with respect to the thermal neutrons is raised to medium when the atom percentage of $^6$Li in the lithium atoms is increased to 7 and that in the active layer is 0.056. In the meantime, the sensitivity of the film dosimeter with respect to the fast neutrons and the photons remains low and medium separately. Furthermore, the sensitivity of the film dosimeter with respect to the thermal neutrons becomes high when the atom percentage of $^6$Li in the lithium atoms is increased to 99, that is, the lithium atoms are mostly composed of $^6$Li, and that in the active layer is 0.792. In the meantime, the sensitivity of the film dosimeter with respect to the fast neutrons and the photons remains low and medium, respectively.

Accordingly, the sensitivity of the film dosimeter with respect to the thermal neutrons can be changed from low to high by adjusting the composition between $^6$Li and $^7$Li in the lithium atoms to allow the film dosimeter detecting the doses of the neutron and gamma-ray radiation mixed field. That is, the films doped with different atom percentage of $^6$Li can detect different doses of the neutron radiation field. That is, a film with a corresponding amount of $^6$Li can be chosen to use in a specific neutron and gamma-ray radiation mixed field and avoid insufficient sensitivity of the film dosimeter with respect to the neutrons as mentioned before.

Because $^1$H has the highest overall elastic scattering cross section than other atoms in the film and it is the dominant atoms in the film composition as well. In addition, it has the most powerful ability to remove neutron kinetic energy per collision; in average, it can remove half of the neutron kinetic energy. Thus, the film dosimeter is further doped with quantitative hydrogen elements ($^1$H), such as thickening a protection layer or adding a deceleration layer, to decrease the fast neutron kinetic energy for detecting the fast neutrons. In details, the film dosimeter can be capable of detecting an extra signal from a reaction of slowing the fast neutrons down into the thermal neutrons by collision with $^1$H. And then, the original dose rate of the fast neutrons will be calculated. That is, the film dosimeter provided in the present invention not only can be used to detect a mixed radiation field, but also to measure a value of a high energy neutron radiation field.

According to another preferred embodiment, the film dosimeter provided in the present invention can comprise a plurality of the GAFCHROMIC® External Beam Therapy 2 (EBT2) films with different abundances. The different abundances represent the films comprise $^6$Li and Li with different composition. For example, the film dosimeter provided in the present invention can comprises a first film composed of the lithium atoms with 1 atom % of $^6$Li and 99 atom % of $^7$Li, a second film composed of the lithium atoms with 99 atom % of $^6$Li and 1 atom % of $^7$Li, but the present invention is not limited thereto. As abovementioned, the radiation dose of the thermal neutrons and the photons can be detected by combining two films with different abundances, and further, the radiation dose of the fast neutrons, the thermal neutrons and the photons can be detected by combining more than three films with different abundances. Thus, the films with different abundances can measure the neutrons with different kinetic energy (i.e. thermal neutrons and fast neutrons) and the photons and be further applied for a neutron and gamma-ray mixed field with wider energy range.

Figure 3:
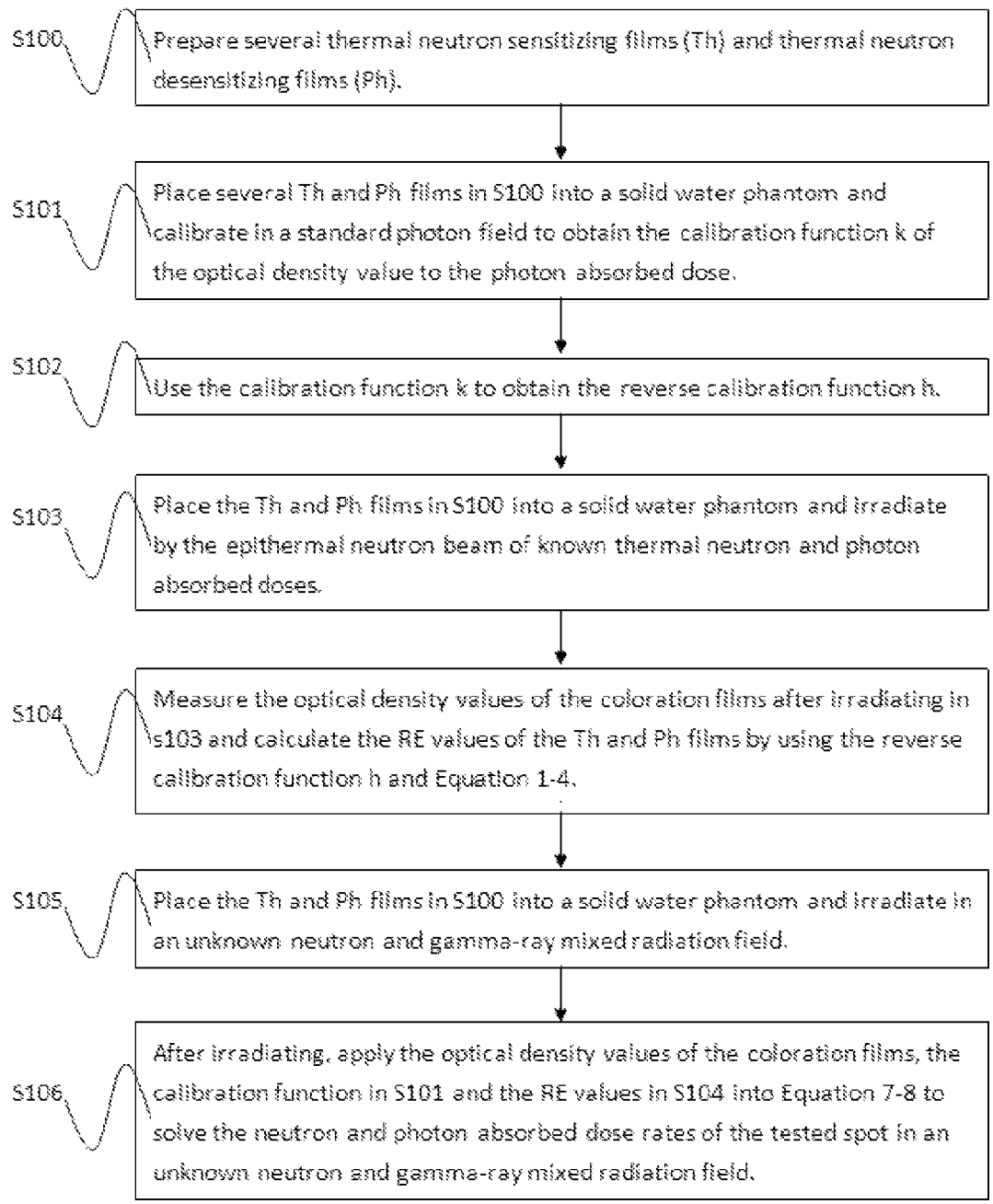
FIG. 3 is a flow chart showing the method of determining radiation dose by using the film dosimeter according to the present invention.
Figure 4:
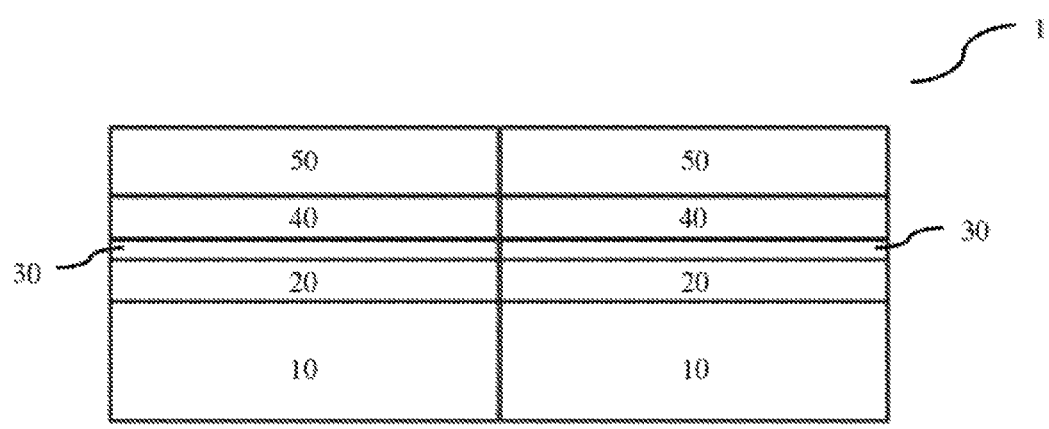
FIG. 4 is a diagram showing the film dosimeter 1 in a side-by-side orientation according to the present invention.
Figure 5:
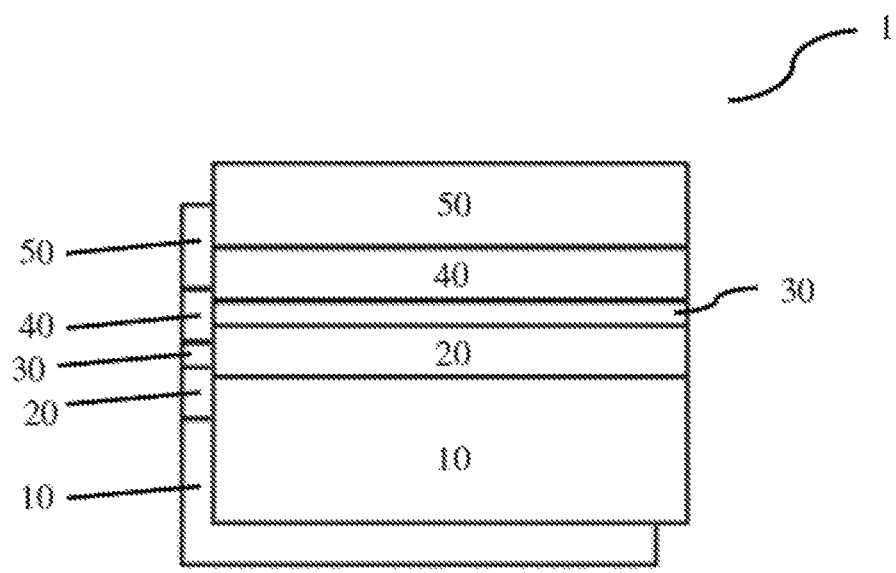
FIG. 5 is a diagram showing the film dosimeter 1 in a overlapping orientation according to the present invention.

The structure of the film dosimeter provided in the present invention is described as abovementioned, and a method of determining radiation dose by using the abovementioned film dosimeter is then illustrated as the following. Please refer to FIG. 3, it shows a flow chart of the method to determine radiation dose by using the film dosimeter according to an embodiment of the present invention.

First, two EBT2 film dosimeters doped with quantitative sensitizer are prepared in step S100. It is noted that the structure and the atom fraction of the sensitizer doped in each of the above two film dosimeters are the same; however, the composition between the lithium atoms and the whole atoms in the active layer of the film dosimeter is different. Moreover, one of the film dosimeters is a thermal neutron sensitizing film ("Th film" hereafter), that is, the sensitivity of the film dosimeter with respect to the thermal neutrons is high. The atom percentage of $^6$Li and $^7$Li in the lithium atoms within the active layer of Th film are ranged from 7 to 99 and from 0.1 to 7 separately. Another one of the film dosimeters is a thermal neutron desensitizing film ("Ph film" hereafter), that is, the sensitivity of the film dosimeter with respect to the thermal neutrons is low. The atom percentage of $^6$Li and $^7$Li in the lithium atoms within the active layer of Ph film are 0.5 and 99.5 separately. However, the present invention is not limited thereto.

Calibration should be performed before using any film dosimeter. Thus, the abovementioned two films should be calibrated at first as shown in step S101. And further, the films should be selected from the same batch and placed in a solid water phantom under a standard photon field. As shown in the preferred embodiment, the film will be divided into small pieces. And then, the small pieces (2×3 cm$^2$) of the films are placed at the depth of the maximum dose to the solid water phantom and irradiated by using a 6 MV X-ray beam. Preferably, the calibration dose range is from 0.2 to 50 Gy. After irradiations, at least 1 to 2 hour self-developing time is recommended. For the response readout, a digital flatbed color scanner was applied to digitize responses in 48□ bits RGB color mode (16 bits per color channel); the readout images were saved in Tagged Image File Format (TIFF). The readout response (pixel value) was translated to obtain an optical density (OD) value. The abovementioned phantom, film size and dose in the calibrating process are only described as an embodiment, but the present invention is not limited thereto. In addition, the step S101 can be skipped if the films from the same batch have been calibrated. The calibration process and the method of measuring coloration degree will not be further discussed in the present invention. After carefully calibrating and obtaining the calibration functions $k_{Ph}$ (OD) and $k_{Th}$ (OD) of the Ph film and Th film, the OD value (value of the coloration degree) can be transferred to the photon absorption dose through the calibration function.

As shown in step S102, the reverse function of the abovementioned calibration function, such as a reverse calibration function h, is obtained.

As shown in step S103, Ph film and Th film from the same batch of the calibrated Ph film and Th film are then placed in the neutron and gamma-ray radiation mixed field, for example, an epithermal neutron beam composed of 5% the fast neutrons (neutron energy above 10,000 eV), 85% the epithermal neutrons (neutron energy between 10,000 eV and 0.5 eV) and 10% of thermal neutrons (neutron energy below 0.5 eV). The films are placed on the beam central axis at depth of 2 cm in the solid water phantom, and the irradiation times of the films are $T_{Ph,1}$ and $T_{Th,1}$ separately. After irradiations, the films are placed for a self-developing time to let the colorization reach an end-point, that is, the colorization becomes stable. And then, the OD value will be obtained as shown in step S104 by measuring a coloration degree of the colorization. Although two films can be placed at the same position and irradiated at the same time, they are irradiated separately in the present invention to avoid mutual interference and to increase precision. According to the present invention, if the fluence rate of the epithermal neutron beam is 5×10$^8$ neutrons cm$^{-2}$ s$^{-1}$ and an exit of the beam is a circle with 14-cm diameter, the irradiation time of the Ph film can be 60 min and that of the Th film can be 1 min, but the present invention is not limited thereto.

After irradiation, the neutrons and photons of the epithermal neutron beam will trigger the colorization of the film dosimeter. Even though the films are irradiated under the same irradiation dose, the coloration degree (OD value) of the Ph and Th films will be different due to their different sensitivities with respect to the thermal neutrons. As to the coloration degree of the Ph film and Th film, they can be defined in the following equations:

$$OD_{Ph}^{S104} = h_{Ph}(D_{\gamma-Eq,Ph}^{S103}) \qquad \text{Equation 1}$$

$$OD_{Th}^{S104} = h_{Th}(D_{\gamma-Eq,Th}^{S103}) \qquad \text{Equation 2}$$

The symbol "h" represents the reverse calibration function of the film, and Ph and Th represented by the subscripts in the equations correspond to the Ph film and the Th film, respectively. The equivalent photon absorption dose of the active layer represented by $D_{\gamma-Eq}$ is obtained from the following equations:

$$D_{\gamma-Eq,Ph}^{S103} = T_{Ph,1}(\dot{D}_\gamma^{103} + RE_{Ph}\dot{D}_n^{103}) \qquad \text{Equation 3}$$

$$D_{\gamma-Eq,Th}^{S103} = T_{Th,1}(\dot{D}_\gamma^{103} + RE_{Th}\dot{D}_n^{103}) \qquad \text{Equation 4}$$

The symbol $\dot{D}_n^{103}$ existed in the above two equations represents the absorption dose rate of the thermal neutrons at the measuring spot and the RE (relative effectiveness) is the equivalent coloration ability of the thermal neutrons in the films; symbol T stands for the irradiation time. The RE value of the two films can be calculated from Equations 1~4 by measuring the $OD_{Ph}^{S104}$ and $OD_{Th}^{S104}$ and the known $\dot{D}_\gamma^{103}$ and $\dot{D}_n^{103}$.

As shown in step S105, the calibrated Ph film and the Th films with known RE value are then placed in the tested neutron and gamma-ray radiation mixed field; for example, a neutron beam with small amount of the epithermal neutrons and large amount of the thermal neutrons. The films are then fixed on the tested spot, for example a solid water phantom, at the depth of 3 cm along the central axis of the irradiating beam. The irradiation times of the two films are $T_{Ph,2}$ and $T_{Th,2}$ respectively which should be long enough to cause observable color change after a self-developing time. Then the coloration degrees are measured to obtain the OD values $OD_{Ph}^{S105}$ and $OD_{Th}^{S105}$ of the Ph film and the Th film. The equivalent photon dose at the tested spot can be calculated from the measured OD values as shown in the following equations:

$$D_{\gamma-Eq,Ph}^{S105} = k_{Ph}(OD_{Ph}^{S105}) \qquad \text{Equation 5}$$

$$D_{\gamma-Eq,Th}^{S105} = k_{Th}(OD_{Th}^{S105}) \qquad \text{Equation 6}$$

The absorbed dose rate of the neutrons and the photons at the tested spot can be calculated as shown in step S106 by the following equations reorganized from Equations 3 to 6:

$$\dot{D}_\gamma^{S105} = (1 - RE_{Ph}RE_{Th})^{-1}\left[\frac{k_{Th}(OD_{Th}^{S105})}{T_{Th,2}} - \frac{k_{Ph}(OD_{Ph}^{S105})}{T_{Ph,2}}RE_{Ph}RE_{Th}\right] \qquad \text{Equation 7}$$

$$\dot{D}_n^{S105} = (RE_{Th} - RE_{Ph})^{-1}\left[\frac{k_{Th}(OD_{Th}^{S105})}{T_{Th,2}} - \frac{k_{Ph}(OD_{Ph}^{S105})}{T_{Ph,2}}\right] \qquad \text{Equation 8}$$

Therefore, the absolute dose rate of the neutron and gamma-ray radiation mixed field can be obtained in the present invention from the coloration degree of the films by utilizing the different sensitivities of the films with respect to the neutrons, not the relative value in the prior art.

To sum up, the film dosimeter, which is capable of detecting doses in the neutron and gamma-ray radiation mixed field, is developed according to the present invention by adjusting the atom percentage between $^6$Li and $^7$Li in the lithium atoms. It is able to overcome the limitations, such as energy range and precision, as mentioned in the prior art. Furthermore, the present invention not only can be applied in the high-energy radiotherapy instruments, but also can be used in detecting environmental radiation (i.e. industrial radiation).

Although the present invention has been described in terms of specific exemplary embodiments and examples, it will be appreciated that the embodiments disclosed herein are for illustrative purposes only and various modifications and alterations might be made by those skilled in the art without departing from the spirit and scope of the invention as set forth in the following claims.

What is claimed is:

1. A film for detecting a dose of a mixed radiation field, comprising:
    a base;
    an active layer being placed on the base and doped with a sensitizer with a quantity of nitrogen atoms, chloride atoms, potassium atoms and bromine atoms;
    a surface layer being placed on the active layer and doped with the sensitizer with a quantity of chloride atoms;
    an adhesive being placed on the surface layer; and
    a top covering on the adhesion layer;
    wherein the sensitizer has quantitative lithium atoms with different atom percentages of lithium-6 ($^6$Li) and lithium-7 ($^7$Li), the atom percentage of $^6$Li in the lithium atoms is ranged from 0.1 to 99.

2. The film according to claim 1, wherein the atom percentage of $^6$Li in the lithium atoms of the sensitizer doped in the active layer of the film is ranged from 7 to 99.

3. The film according to claim 1, wherein the atom percentage of $^6$Li in the lithium atoms of the sensitizer doped in the active layer of the film is ranged from 0.1 to 7.

4. The film according to claim 1, wherein the mixed radiation field is a neutron and gamma-ray radiation mixed field.

5. The film according to claim 1, wherein the sensitizer is further doped with quantitative hydrogen elements ($^1$H) to decrease a neutron kinetic energy for detecting a fast neutron dose.

6. A method of determining radiation doses in a mixed radiation field, comprising the following steps:
    providing several film dosimeters doped with a sensitizer comprising quantitative lithium atoms, wherein the lithium atoms comprise different atom percentages of lithium-6 ($^6$Li) and lithium-7 ($^7$Li) and a structure and a atom fraction of the sensitizer doped in each of the several film dosimeters are the same but a composition between the lithium-6 and lithium-7 atoms of the sensitizer doped in each of the film dosimeters is different;
    irradiating the film dosimeters by a neutron beam;
    placing the film dosimeters for a self-developing time till a colorization reaches a stable end-point;
    scanning the film dosimeters; and
    measuring values of the colorization, wherein the values correspond to a coloration degree of the colorization and are applied for calculating a neutron dose of the mixed radiation field.

7. The method according to claim 6, wherein after the step of scanning the film dosimeters further comprising:
    obtaining optical density values.

8. The method according to claim 7, wherein the step of calculating the neutron dose of the mixed radiation field is performed to obtain the neutron dose and a gamma-ray dose of the colorization by utilizing the optical density values and an equivalent coloration value of the film dosimeters with respect to thermal neutrons.

9. The method according to claim 8, wherein the step of calculating the neutron dose of the colorization is performed according to a conversion equation set up by a plurality of equivalent doses and colorization values measured by the film dosimeters with different sensitivities with respect to the thermal neutrons.

10. The method according to claim 6, wherein the mixed radiation field is a neutron and gamma-ray radiation mixed field.

11. The method according to claim 6, wherein a sensitivity of each of the film dosimeters with respect to thermal neutrons is decreased or increased by adjusting the atom percentage of $^6Li$ in the lithium atoms.

12. The method according to claim 11, wherein the atom percentage of $^6Li$ in the lithium atoms is ranged from 0.1 to 99.

13. The method according to claim 6, wherein the film dosimeter is further doped with quantitative hydrogen elements ($^1H$) to decrease a neutron kinetic energy for detecting a fast neutron dose.

14. A method of determining radiation doses in a mixed radiation field, comprising the following steps:

providing several film dosimeters doped with a sensitizer comprising quantitative lithium atoms, wherein the lithium atoms comprise different atom percentages of lithium-6 ($^6Li$) and lithium-7 ($^7Li$) and a structure and a atom fraction of the sensitizer doped in each of the several film dosimeters are the same but a composition between the lithium-6 and lithium-7 atoms of the sensitizer doped in each of the film dosimeters is different;

performing to calibrate each of the several film dosimeters before using any one, and obtaining a calibration function (k) of an optical density value to a photon absorbed dose in a standard photon field;

using the calibration function (k) to obtain a reverse calibration function (h);

irradiating the film dosimeters by an epithermal neutron beam of known thermal neutron and photon absorbed doses;

measuring the optical density values of the film dosimeters and calculating each of relative effectiveness values of the several film dosimeters;

irradiating the film dosimeters by an unknown neutron and gamma-ray mixed radiation field;

computing a neutron and photon absorbed dose rates in the unknown neutron and gamma-ray mixed radiation field.

* * * * *